United States Patent [19]

Meadows et al.

[11] Patent Number: 4,853,498

[45] Date of Patent: Aug. 1, 1989

[54] POSITION MEASUREMENT APPARATUS FOR CAPACITIVE TOUCH PANEL SYSTEM

[75] Inventors: Robert D. Meadows, Beaverton; Roger J. McCoy, Portland, both of Oreg.

[73] Assignee: Tektronix, Inc., Beaverton, Oreg.

[21] Appl. No.: 205,896

[22] Filed: Jun. 13, 1988

[51] Int. Cl.[4] ............................................. G08C 21/00
[52] U.S. Cl. ...................................... 178/19; 340/706
[58] Field of Search ...................... 178/18, 19; 340/706

[56] References Cited

U.S. PATENT DOCUMENTS 4,476,463 10/1984 Ng et al. .............................. 340/712
4,707,845 11/1987 Krein et al. ............................ 178/19

OTHER PUBLICATIONS

Panttaja, "Touch screens let your fingers provide a fast, simple entry into the computer," *Electronics*, Apr. 19, 1984, 140–144.

*Primary Examiner*—Stafford D. Schreyer
*Attorney, Agent, or Firm*—John D. Winkelman; Mark M. Meininger

[57] ABSTRACT

A capacitive touch panel system (10) having a faceplate (14) with an electrically conductive layer (20) of a consistent resistivity employs a position measurement apparatus (12) to generate an address signal indicative of a position (46) on the faceplate in contact with a stylus (48). The position measurement apparatus includes a position measurement signal source (62) that generates a square-wave measurement signal of substantially constant frequency and a preselected magnitude. The position measurement signal is applied to a first pair of opposed electrodes (36) and (40) and a second pair of opposed electrodes (38) and (42) positioned along respective side margins (26, 30, 28, and 32) of the faceplate. The resistivity of the conductive layer establishes effective resistances of $R_x$ and $R_y$ between the respective first and second pairs of electrodes. Position measurement subcircuits (60a–60d) measure currents drawn through the electrodes whenever the stylus contacts the conductive layer, thereby to form an address signal indicative of the location at which the stylus contacts the faceplate.

25 Claims, 3 Drawing Sheets

POSITION MEASUREMENT APPARATUS FOR CAPACITIVE TOUCH PANEL SYSTEM

TECHNICAL FIELD

The present invention relates to touch panel systems of the type having electrically conductive faceplates and, in particular, to such a touch panel system in which a position measurement apparatus generates an address signal that is indicative of a location at which a stylus contacts the faceplate.

BACKGROUND OF THE INVENTION

A touch panel system is a data input device that allows an operator to interact with information rendered on a display screen. For example, the operator can select one of multiple computer command options rendered at different locations on the display screen by touching the screen at one of the locations. A touch panel system employs a position measurement apparatus that generates an address signal that is indicative of the touched location. The address signal is delivered to a computer that determines from the address signal which one of the command options is selected. The object with which the operator touches the display screen is called a stylus and may include, for example, the operator's finger, a pen, or a pencil.

A touch panel system of the capacitive-type typically includes a faceplate that has on its outer major surface an optically transparent, electrically conductive coating of a preselected resistivity. The faceplate is positioned in front of the display screen of a display device so that an operator can touch the conductive coating at locations aligned with information rendered on the display screen. The operator touches the conductive coating with a stylus having a nonzero, finite capacitance with reference to electrical ground. Such a touch panel system distinguishes the location the stylus contacts from the other locations on the faceplate by determining the location at which there is the capacitance characteristic of the stylus.

One type of capacitive touch panel system is described in Panttaja, "Touch screens let your fingers provide a fast, simple entry into the computer," *Electronics*, April 19, 1984, 140–144. The electrically conductive coating on the faceplate of the Panttaja system is patterned in the form of multiple electrically isolated, rectangular areas or "pads" positioned at different, fixed locations on the faceplate. Since each of the pads is electrically isolated, the Panttaja system is capable of supporting only a limited number of pads (i.e. up to about 32) to allow sufficient surface area on the faceplate for an electrical conductor connecting each pad to the touch detection apparatus.

Information to be selected by an operator is rendered on the display screen in alignment with preselected ones of the pads. The touch panel system employs the touch detection apparatus to detect contact between a stylus and any one of the pads. The touch detection apparatus generates a two-state output signal (i.e., TOUCH or NO-TOUCH) for each one of the pads and cannot distinguish between different locations on a single pad. Such a touch panel system suffers, therefore, from the disadvantages of being inflexible because of the fixed locations of the pads on the faceplate and being impractical for use in sophisticated applications because of the limited number of distinguishable touch locations.

U.S. Pat. No. 4,476,463 of Ng et al., describes a capacitive touch panel system having a rectangular faceplate with an electrically conductive coating. The conductive coating has a preselected resistivity, covers the entire outer major surface of the faceplate, and carries four bar electrodes. A different one of the bar electrodes extends along almost the entire length and near each of the side margins of the outer major surface of the faceplate. The bar electrodes form two pairs of opposed electrical contacts that define two orthogonal axes across the faceplate. Each bar electrode is electrically connected to the conductive coating and a touch locating circuit. One of the bar electrodes is also electrically connected to a touch detection circuit of the type employed in the Panttaja system. The touch detection circuit and the touch locating circuit cooperate to determine the location at which the stylus touches the faceplate.

The touch detection circuit first detects contact between the conductive coating and a capacitive stylus. Whenever the touch detection circuit detects such contact, the touch locating circuit then measures changes in the impedance of the conductive coating caused by the contact. The impedance measurement typically is performed sequentially with reference to each of the bar electrodes A microprocessor analyzes the impedance measurements obtained from the four electrodes to determine the location at which the stylus touches the faceplate.

In one embodiment, the touch locating circuit includes an impedance measurement signal source that applies a variable-frequency measurement signal of the square-wave type to successive ones of the bar electrodes, thereby to identify with respect to each electrode the location at which the stylus touches the faceplate. The square-wave signal switches between a first positive signal voltage and electrical ground. The signal source changes the frequency of the measurement signal applied to a bar electrode until the combined resistance-capacitance characteristics of the faceplate and the contacting stylus have a predetermined effect on the signal, as described below with reference to one of the four bar electrodes.

The measurement signal applied to the bar electrode is initially of a first frequency that is sufficiently low that the measurement signal is capable of charging and discharging the faceplate to the first signal voltage and ground, respectively. Such charging and discharging occurs despite the presence of stored charge resulting from the capacitive effects of the faceplate and the stylus. A comparator receives the measurement signal present on the faceplate and a positive DC reference voltage of lesser magnitude than that of the first signal voltage. Since the faceplate is completely charged and discharged, the comparator generates an alternating output signal. In response to such an alternating output signal, the measurement signal source incrementally increases the frequency of the measurement signal.

The measurement signal frequency incrementally increases to a sufficiently high level so that the faceplate voltage never drops below the reference voltage. As a result, the measurement signal delivered to the comparator maintains a voltage magnitude greater than that of the DC reference voltage, and the comparator generates an output signal of a substantially constant voltage.

The measurement signal frequency at which the comparator generates the output signal of constant voltage represents the location at which the stylus touches the faceplate relative to the one bar electrode. This frequency is compared with a reference frequency to identify the location. The reference frequency is the frequency at which the measurement signal causes the comparator to generate a DC output signal when no stylus is in contact with the faceplate and a reference capacitor is electrically connected between the opposed bar electrode and electrical ground. Information relating to the reference frequency is stored in a random-access memory and is compared by a microprocessor with the frequency relating to a touch location.

The above-described measurement is performed successively for each one of the four electrodes. The microprocessor then analyzes the four measurements to identify the touch location.

The touch panel system of Ng et al. suffers, however, from at least three disadvantages. First, the touch locating circuit identifies a touch position relatively slowly because the incremental frequency change of the measurement signal requires multiple applications of the signal to the faceplate. Second, the touch panel system is of a relatively complex design because the system employs both a touch detection circuit and a touch locating circuit. The design is further complicated in that the touch locating circuit employs two comparisons that include a comparison of the measurement signal frequency with a DC reference voltage to form an output signal and a comparison of the resulting output signal with a corresponding output signal for a reference frequency. Third, the relatively large area of the faceplate-covering conductive coating causes it to conduct stray electric fields. As a consequence, the touch panel system is susceptible to receiving electrical noise signals that can be of magnitudes greater than the magnitude of the measurement signal.

SUMMARY OF THE INVENTION

An object of the present invention is, therefore, to provide a position measurement apparatus for a capacitive touch panel system.

Another object of this invention is to provide such an apparatus in which a touch location on the display panel can be identified relatively quickly.

A further object of this invention is to provide such a system of comparatively simple design.

Still another object of this invention is to provide such a system that includes electrical noise-compensating features.

The present invention is a touch panel system with a position measurement apparatus that generates an address signal indicative of a position on the touch panel in contact with a capacitive stylus. The stylus has a nonzero, finite capacitance with reference to electrical ground.

In a preferred embodiment, the touch panel system includes a rectangular faceplate with an electrically conductive layer. The conductive layer has a consistent resistivity, covers the entire outer major surface of the faceplate, and carries four bar electrodes. A different one of the bar electrodes extends along almost the entire length and near each of the side margins of the outer major surface of the faceplate. The bar electrodes form two pairs of generally parallel opposed electrical contacts. Each bar electrode is electrically connected to the conductive layer and the position measurement apparatus.

The position measurement apparatus includes a measurement signal source that generates a fixed-frequency measurement signal that is simultaneously applied to each of the bar electrodes. The apparatus identifies a position on the faceplate in contact with the stylus by measuring the measurement signal current that the stylus draws through each electrode. The current drawn through each electrode is inversely proportional to the separation between the electrode and the position at which the stylus touches the faceplate. The current measurements obtained with respect to the four electrodes are analyzed by a microprocessor to identify the position.

The position is identified separately with respect to each one of the bar electrodes. The following description relates to the position identification with respect to an exemplary one of the bar electrodes. Such description would apply similarly to each of the three remaining electrodes.

The signal source transmits the measurement signal to the bar electrode through the primary coil of a transformer. The transformer develops across the output terminals of a secondary coil a potential difference proportional to the current that the stylus draws through the bar electrode. A differential amplifier having first and second input terminals is electrically connected to the output terminals of the secondary coil of the transformer. The differential amplifier receives the potential difference and generates an output signal proportional to the current. The transformer cooperates, therefore, with the differential amplifier to function as a current meter that measures the current drawn through the electrode.

This position measurement apparatus is capable of identifying a touch position with a single application of the measurement signal and is, therefore, capable of identifying the touch position relatively quickly. Moreover, the position measurement apparatus directly measures the current drawn through each bar electrode, does not require the generation or storage of a reference signal, and does not require a touch detector to separately detect contact between the faceplate and the stylus. The position measurement apparatus s, therefore, of relatively simple design.

The position measurement apparatus of this invention further includes several electrical noise-compensating features. One such feature is a blanking circuit that disrupts or blanks the measurement apparatus in response to noise signals of relatively large magnitudes. Another such feature is the use of lock-in detection techniques in the analysis of the fixed-frequency measurement signal.

Additional objects and advantages of the present invention will be apparent from the detailed description of a preferred embodiment thereof, which proceeds with reference to the accompanying drawings.

DETAILED DESCRIPTION OF PREFERRED EMBODIMENT

Figure 1:
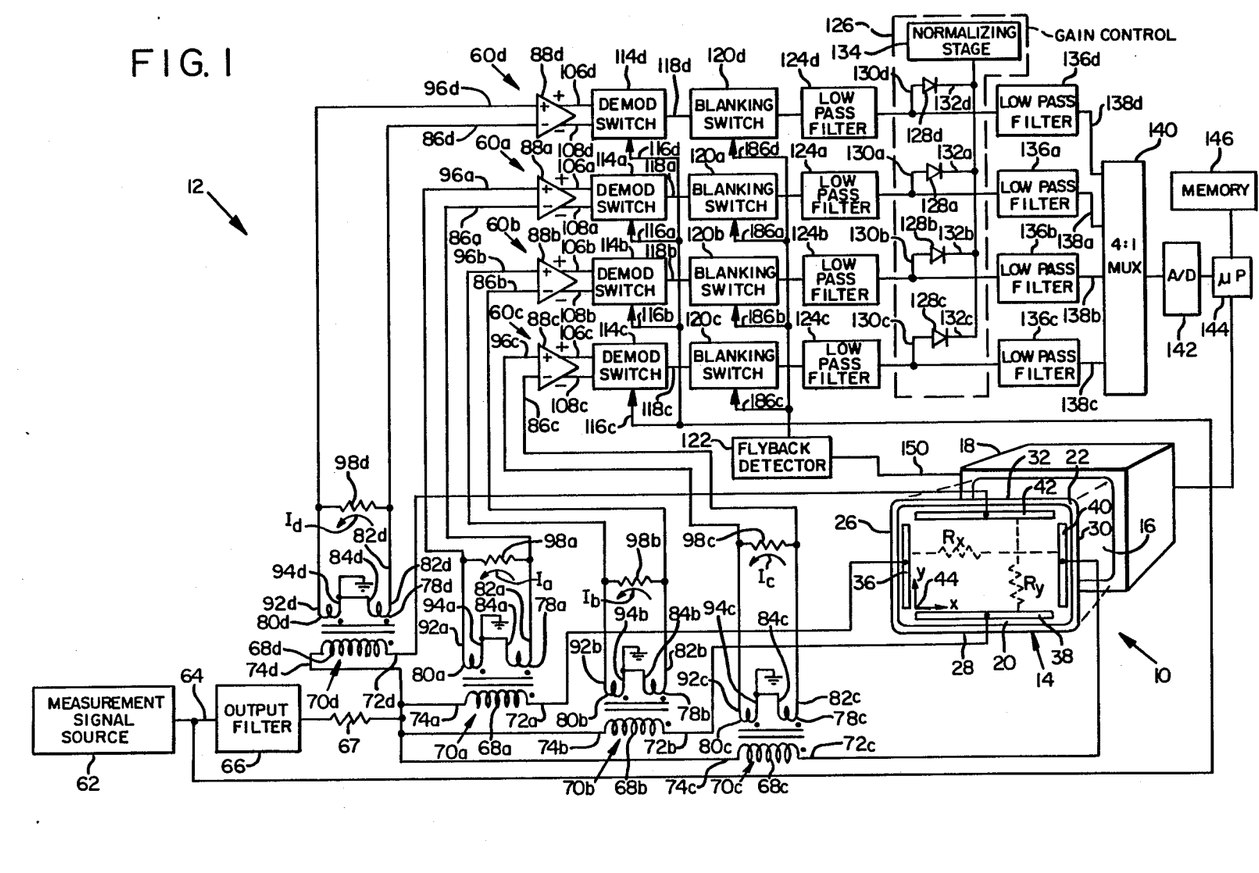
FIG. 1 is a schematic block diagram of a position measurement apparatus implemented in a touch panel system of the present invention.

FIG. 1 schematically shows a touch panel system 10 and an associated position measurement apparatus 12 of the present invention. Touch panel system 10 includes an optically transparent faceplate 14 positioned face-to-face with the display screen 16 of a display device 18 that incorporates, for example, a cathode-ray tube. It will be appreciated that the display device 18 could alternatively include a liquid crystal display or a signboard that displays fixed information such as a numeric key pad.

Faceplate 14 includes an optically transparent, electrically conductive layer 20 that covers substantially all of an outer major surface 22 of faceplate 14. Layer 20 is formed from indium tin oxide (ITO) and has a consistent resistivity. Faceplate 14 is typically of a rectangular shape and includes on major surface 22 a first pair of opposed side margins 26 and 28 and a second pair of opposed side margins 30 and 32.

Electrodes 36, 38, 40, and 42 in the form of bars or strips are positioned on and extend along major portions of the lengths of side margins 26, 28, 30, and 32, respectively. Electrodes 36 and 40 and electrodes 38 and 42 form two pairs of opposed electrical contacts that are electrically connected along their lengths to conductive layer 20. Electrodes 36 and 40 define across faceplate 14 a X-axis having its origin 44 located near the bottom side of electrode 36, and electrodes 38 and 42 define across faceplate 14 a Y-axis having its origin 44 located near the left side of electrode 38.

The resistivity of layer 20 establishes effective total resistances $R_x$ and $R_y$ in the respective X- and Y-axis directions across faceplate 14. Position measurement apparatus 12 identifies a position or location 46 on faceplate 14 in contact with a capacitive stylus 48 (FIG. 2) such as, for example, a person's finger. (The location 46 is hereinafter referred to as "touch location 46"). Stylus 48 may be modeled as a capacitor 50 and a resistor 52 electrically connected in parallel to ground. Capacitor 50 can have a capacitance of between 5 and several hundred picofarads. Resistor 52 can have effectively any resistance. Position measurement apparatus 12 identifies touch location 46 by measuring the separation between location 46 and each one of electrodes 36, 38, 40, and 42.

Position measurement apparatus 12 comprises four similar position measurement subcircuits 60a, 60b, 60c and 60d. each being electrically connected to a respective one of electrodes 36, 38, 40, and 42 to generate an address signal indicative of the separation between touch location 46 and the electrode. Subcircuits 60a–60d preferably operate simultaneously or "in parallel" to generate the address signal. Corresponding components of position measurement subcircuits 60a–60d have identical reference numerals with letter suffices "a"–"d", respectively. The following description is directed by way of example only to position measurement subcircuit 60a and is similarly applicable to position measurement subcircuits 60a 60d.

A position measurement signal source 62 generates a bipolar continuous square-wave measurement signal and is delivered to an input 64 of a source output filter 66. The measurement signal alternates between a positive voltage, +V, and a negative voltage level, −V, at a substantially constant frequency of between 100 and 200 kHz. Output filter 66 is preferably of the low-pass type and cooperates with an output resistor 67 to establish an output impedance of 2 kilohms. This output impedance functions to improve the uniformity of the signal-to-noise ratios of the signals on electrodes 36-42, as will be described below in greater detail. Output filter 66 delivers the square-wave measurement signal to electrode 36 via the primary coil 68a of a transformer 70a. Primary coil 68a is arranged so that its positive terminal 72a and negative terminal 74a are electrically connected to electrode 36 and the output resistor 67 of filter 66, respectively.

Figure 2:
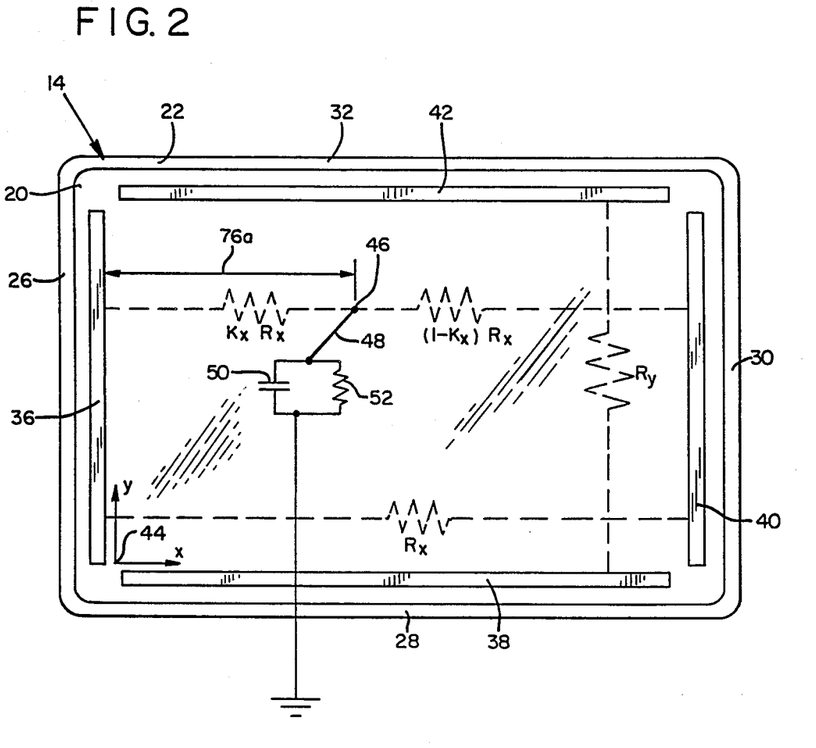
FIG. 2 is an enlarged frontal schematic diagram of the faceplate of the touch panel system of FIG. 1.

With reference to FIGS. 1 and 2, stylus 48 in contact with touch location 46 may be modeled as dividing the resistance R into a first resistance $k_x R_x$ and a second resistance $(1-k_x)R_x$, the term $k_x$ representing the normalized distance 76a between touch location 46 and electrode 36. The first resistance represents the resistance of layer 20 between touch location 46 and electrode 36, and the second resistance represents the resistance of layer 20 between touch location 46 and electrode 40. Stylus 48 in contact with layer 20 draws currents proportional to the measurement signal to electrical ground. Position measurement subcircuits 60a and 60c measure the currents drawn to electrical ground via the respective first and second resistances, thereby to indicate the position of touch location 46 along the X-axis.

With reference to position measurement subcircuit 60a transformer 70a includes two secondary coils 78a and 80a that are inductively coupled to primary coil 68a. Secondary coil 78a has a positive terminal 82a and a negative terminal 84a that are electrically connected to an inverting input 86a of a differential amplifier 88a, and ground, respectively. Similarly, secondary coil 80a has a negative terminal 92a and a positive terminal 94a electrically connected to a noninverting input 96a of differential amplifier 88a and ground, respectively. Differential amplifier 88a operates in the differential-input, differential output mode.

The current drawn to ground via the first resistance flows through primary coil 68a. This current induces in secondary coils 78a and 80a a current I that flows through positive terminal 82a, negative terminal 92a, and a resistor 98a of 22 ohms that is connected between them. The current $I_a$ generates across resistor 98a, a potential difference proportional to the current drawn through electrode 36 by the presence of stylus 48 at touch location 46. The potential difference is applied to inputs 86a and 96a of differential amplifier 88a, which generates at its positive output 106a and negative output 108a respective positive and negative differential output signals representing the current drawn through electrode 36. The differential output signals are modulated at the measurement signal frequency, and the magnitudes of the differential output signals are inversely proportional to the distance 76a between touch location 46 and electrode 36.

Outputs 106a and 108a deliver the positive and negative differential output signals to different inputs of a single pole-double throw demodulation switch 114a having a switching control input 116a that receives the measurement signal generated by measurement signal source 62. Switch 114a generates a demodulated output signal by delivering to output 118a the positive and negative differential output signals during the respective +V and -V voltage levels of the measurement signal. As a result, differential amplifier 88a and switch 114a cooperate to function as a "lock-in" amplifier that is "locked-in" to the measurement signal frequency and coherently demodulates the differential output signals.

The demodulated output signal represents a relatively low-noise, substantially steady-state address signal that corresponds to an average of the magnitude of the current drawn through electrode 36; is indicative of the distance 76a between touch location 46 and electrode 36; and is substantially independent of the relative impedances of capacitor 50 and resistor 52 of stylus 48. The steady-state address signal is delivered to a measurement blanking switch 120a controlled by a flyback pulse detection means or circuit 122 that communicates with the cathode-ray tube of display device 18 and periodically interrupts the signal over time intervals during which the cathode-ray tube could introduce substantial amounts of electrical noise into the signal.

The cathode-ray tube of display device 18 forms an image by scanning an electron beam (not shown) in a raster pattern across display screen 16. Such an image is formed of image frames that include between about 200 and 2,000 horizontal scan lines and that are addressed at frequencies of between 30 and 90 Hz. The beam current of the scanning electron beam changes in accordance with the magnitude of a video signal that carries information representing the image to be rendered. The video signal further includes for each horizontal scan line a flyback or retrace pulse that directs the electron beam to return to a starting scan position after the completion of each successive horizontal scan line. The flyback pulses relate in a one-to-one fashion to the horizontal scan lines and occur, therefore, at frequencies of about 15-200 kHz.

Conductive layer 20 of touch panel system 10 has a relatively large surface area (e.g., about 1100 cm$^2$) that causes the layer to function as a capacitor. As a consequence, the flyback pulses on a video signal are capacitively induced onto layer 20, thereby introducing noise signals of substantial magnitudes into measurement system 12. For example, the noise signals associated with the flyback pulses can have voltage magnitudes up to about 100 times the magnitude of the measurement signal on conductive layer 20. Flyback detection circuit 122 interrupts the steady-state address signal during flyback pulses and thereby prevents inaccurate and false position measurements of touch location 46.

During periods of time between successive flyback pulses, flyback detection circuit 122 delivers on its output the steady-state address signal to a first low pass filter 124a having a 3 dB cut-off frequency of 3.3 kHz. The cut-off frequency of low pass filter 124a is selected so that it rapidly delivers a filtered address signal of substantial magnitude to an automatic gain control circuit 126. Gain control circuit 126 includes diodes 128a, 128b, 128c and 128d that receive at their anodes 130a, 130b, 130c, and 130d the measurement signals generated by the respective position measurement subcircuits 60a, 60b 60c, and 60d. The cathodes 132a, 132b, 132c, and 132d of the respective diodes 128a, 128b, 128c and 128d are electrically connected and deliver to a gain normalizing stage 134 the one of the address signals generated by subcircuits 60a–60d having the greatest voltage magnitude. Normalizing stage 134 automatically normalizes further processing of the addressing signals with reference to the on measurement signal.

Filter 124a also delivers the address signal to a second low pass filter 136a having a 3 dB frequency of 100 Hz for optimizing the signal-to-noise ratio of the address signal. Filters 124a and 136a cooperate to reject incoherent noise signals that are injected into touch panel system 10 by electromagnetic waves or a system user. Filter 136a delivers the address signal to an input 138a of a four input-to-one output analog multiplexer 140, which transmits in a serial fashion to an analog-to-digital converter 142 the address signals generated by subcircuits 60a–60d. Analog-to-digital converter 142 communicates with a microprocessor 144 that receives the digital address signals and generates in response to them the X- and Y-coordinates of touch location 46.

The following sets forth, by way of example only, a description of the manner in which microprocessor 144 identifies the position of touch location 46 along only the X-axis. The demodulated address signals generated by measurement subcircuits 60a and 60c are DC voltages, V and V:, that are proportional to the currents drawn through electrodes 36 and 40, respectively. With the position of touch location 46 along the X-axis represented by distance 76a (FIG. 2) and the variable X, microprocessor 144 represents the X-coordinate as:

$$X = V_1/(V_1 + V_2)$$

It will be appreciated that microprocessor 144 would employ a similar equation together with the demodulated address signals generated by subcircuits 60b and 60d to determine only the Y-coordinate of touch location 46.

To identify both the X- and Y-coordinates of touch location 46, microprocessor 144 communicates with a memory circuit 146 that stores a look-up table listing the X- and Y-axis coordinates corresponding to particular measurement signal magnitudes. The look-up table may be empirically generated for each touch panel system to accommodate any irregularities in the resistivity of the conductive layer.

Touch panel system 10 is of a sturdy or robust configuration that also provides low-power operation. The configuration of system 10 is robust because of the limited number of electrodes in contact with conductive layer 20 and the inherent sturdiness of transformers. The low-power operation of system 10 is obtained because substantially no power is dissipated from conductive layer 20 unless it is touched by a stylus.

Figure 3:
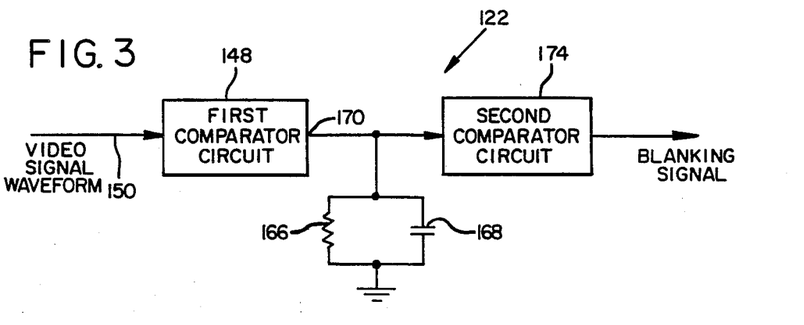
FIG. 3 is a circuit block diagram of a flyback pulse detection circuit employed in the position measurement apparatus of FIG. 1 to compensate for the effects of noise signals introduced into the system.
Figure 4:
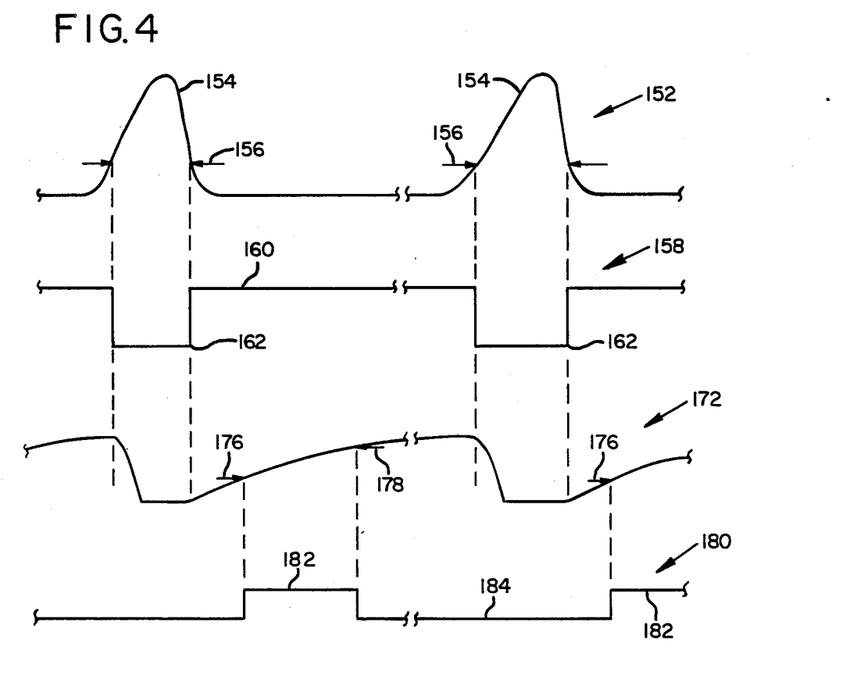
FIG. 4 is a signal timing diagram relating to the operation of the blanking circuit of FIG. 3.

With reference to FIGS. 3 and 4, flyback pulse detector circuit 122 includes a first comparator circuit 148 having an input 150 that receives a voltage waveform corresponding to the high voltage video signal by which the cathode-ray tube of display device 18 renders an image. The video signal includes a flyback signal component 152 having multiple periodic flyback pulses 154 that occur at a frequency of, for example, about 15 kHz. The waveform may be formed by wrapping a conductor around a portion of the high-voltage lead carrying the video signal, thereby to establish a capacitive or magnetic coupling that delivers flyback pulses 154 to comparator circuit 148 without interfering with the video signal.

Whenever a flyback pulse 154 is of a voltage magnitude greater than a preselected threshold voltage level 156, comparator circuit 148 forms an output signal 158 that is in a HIGH logic state 160. Whenever the flyback signal component 152 is of a voltage magnitude less than threshold level 156, the output signal 158 formed by comparator circuit 148 is in a LOW logic state 162.

A resistor 166, which is one of multiple resistors of different impedances (not shown), and a capacitor 168 of 0.001 microfarads are electrically connected in parallel between the output 170 of comparator circuit 148 and electrical ground. Resistor 166 is selected to cooperate with capacitor 168 to establish an RC rise time that is substantially equal to the time interval between successive flyback pulses 154. Resistor 166 and capacitor 168 modify output signal 158 and form an intermediate signal 172 that is delivered to a second comparator circuit 174.

Whenever intermediate signal 172 is of a voltage magnitude that is between a first threshold level 176 and a second threshold level 178, comparator circuit 174 forms a blanking output signal 180 that is in a HIGH logic state 182. Whenever intermediate signal 172 is of a voltage magnitude less than threshold level 176 or greater than threshold level 178, the blanking output signal 180 formed by comparator circuit 74 is in a LOW logic state 184. Blanking output signal 180 is delivered to the control inputs 186a, 186b, 186c and 186d of blanking switches 120a, 120b, 120c and 120d respectively. Signal 180 directs the blanking switches to interrupt the address signals on measurement subcircuits 60a-60d whenever the output signal 180 is in LOW logic state 184, thereby blanking subcircuits 60a-60d during flyback pulses 154.

With reference to FIG. 1, the means by which output resistor 67 of filter 66 functions to improve the uniformity of the signal-to-noise ratios of the signals applied to measurement subcircuits 60a-60d is described with reference to an exemplary system that does not employ output resistor 67. Whenever a user touches the faceplate of the exemplary system at a location that is very close to an electrode that indicates position along a first axis, nearly all of the electrical current flowing from the faceplate and through the person is drawn from that electrode. Under these conditions, very little current is drawn from the electrodes that indicate position in the other axis. As a consequence, the magnitude of the signal-to-noise ratio of signals indicating position along the first axis can be up to 1,000 times greater than the magnitude of the signal-to-noise ratio of the signals indicating position along the orthogonal axis. Such a range of signal-to-noise ratios imposes extreme operating constraints on the dynamic range capabilities of the position measurement apparatus.

Output resistor 67 of filter 66 improves the uniformity of the signal-to-noise ratios of the signals applied to measurement subcircuits 60a-60d by providing each one of electrodes 36-42 with a nonzero resistance through which stylus 48 draws current. As a result, the currents drawn through electrodes 36-42 are of comparable magnitudes and typically differ by less than an order of magnitude. Resistor 67 functions, therefore, as an automatic gain control that substantially reduces the dynamic range requirements of subcircuits 60a-60d and allows a system user to "load" signal source 62.

It will be obvious to those having skill in the art that many changes may be made in the above-described details of the preferred embodiment of the present invention without departing from the underlying principles thereof. The scope of the present invention should be determined, therefore, only by the following claims.

We claim:

1. In a display system including a display surface positioned adjacent an optically transparent, electrically conductive layer having a first resistivity and first and second opposed side margins of preselected lengths, a position address encoder for generating an address signal indicative of a location on the conductive layer in contact with a stylus that is electrically connected to a reference potential, comprising:

time-varying position measurement signal of substantially constant frequency and preselected magnitude;

first and second bar electrodes positioned along the lengths of the respective first and second opposed side margins and receiving the position measurement signal generated by the signal generating means, the resistivity of the conductive layer establishing an effective total resistance between the first and second bar electrodes; and current measuring means for measuring currents corresponding to the position measurement signal and drawn through the first and second bar electrodes whenever a stylus contacts the conductive layer, whereby the stylus contacting the conductive layer divides the total resistance into first and second resistances that cause currents to be drawn through the respective first and second bar electrodes in proportion to the separation between the bar electrodes and the location.

2. The encoder of claim 1 further comprising a source output filter having a high output impedance and being electrically connected between the signal generating means and the electrodes.

3. The encoder of claim 2 in which the source output filter includes a low-pass filter.

4. The encoder of claim 1 in which the position measurement signal is a continuous squarewave signal.

5. The encoder of claim 1 in which the current measuring means measures in parallel the currents drawn through the first and second electrodes.

6. In a display system including a display surface positioned adjacent an optically transparent, electrically conductive layer having a first resistivity and first and second opposed side margins of preselected lengths, a position address encoder for generating an address signal indicative of a location on the conductive layer in contact with a stylus that is electrically connected to a reference potential, comprising:

signal generating means for generating a time-varying position measurement signal of substantially constant frequency and preselected magnitude;

first and second electrodes positioned along the lengths of the respective first and second opposed side margins and receiving the position measurement signal generated by the signal generating means, the resistivity of the conductive layer establishing an effective total resistance between the first and second electrodes; and current measuring means for measuring currents corresponding to the position measurement signal and drawn through the first and second electrodes whenever a stylus contacts the conductive layer, whereby the stylus contacting the conductive layer divides the total resistance into first and second resistances that cause currents to be drawn through the respective first and second electrodes in proportion to the separation between the electrodes and the location, the current measuring means including means for generating a first potential difference proportional to a current drawn through the first electrode, and a first differential amplifier having first and second inputs across which the first potential difference is applied, the first differential amplifier forming on a first output a signal representing the current drawn through the first electrode.

7. The encoder of claim 6 in which the current measuring means further includes means for generating a second potential difference proportional to a current drawn though the second electrode, and a second differential amplifier having third and fourth inputs across which the second potential difference is applied, the second differential amplifier forming on a second output a signal representing the current drawn through the second electrode.

8. The encoder of claim 1 in which the conductive layer is disposed on an optically transparent faceplate positioned adjacent the display surface.

9. The encoder of claim 1 in which the conductive layer further comprises third and fourth opposed side margins of preselected lengths positioned in a transverse direction to the first and second side margins and in which the encoder further comprises:

third and fourth electrodes positioned along the lengths of the respective third and fourth bar opposed side margins and receiving the position measurement signal generated by the signal generating means; and current measuring means for measuring currents corresponding to the position measurement signal and drawn through the third and fourth bar electrodes whenever the stylus contacts the conductive layer.

10. The encoder of claim 9 in which the location at which the stylus contacts the conductive layer is defined in connection with first and second orthogonal axes and in which the currents drawn through the first and second bar electrodes define the location along the first axis and the currents drawn through the third and fourth bar electrodes define the location along the second axis.

11. In a display system including a display surface positioned adjacent an optically transparent, electrically conductive layer having a first resistivity and first and second opposed side margins of preselected lengths along which are positioned respective first and second bar electrodes, the resistivity of the conductive layer establishing an effective total resistance between the first and second bar electrodes, a method for generating an address signal representing a location on the conductive layer in contact with a stylus that is electrically connected to a reference potential, comprising:

applying to the first and second bar electrodes a time-varying position measurement signal of substantially constant frequency and a preselected magnitude; and measuring currents drawn through the first and second bar electrodes and corresponding to the measurement signal whenever a stylus contacts the conductive layer, whereby the stylus contacting the conductive layer divides the total resistance into first and second resistances that cause currents to be drawn through the respective first and second bar electrodes in proportion to the separation between the electrodes and the location.

12. A touch panel system having an optically transparent, electrically conductive surface positioned adjacent a display screen upon which an image is rendered in response to an image signal, the conductive surface including first and second side margins of preselected lengths and receiving an electrical noise a component of the image signal, comprising:

signal generating means to generate a timevarying position measurement signal of a substantially constant frequency and a preselected magnitude;

first and second bar electrodes positioned along the lengths of the respective first and second side margins and receiving the position measurement signal generated by the signal generating means, the resistivity of the conductive layer establishing an effective total resistance between the first and second bar electrodes;

current measuring means to measure currents corresponding to the position measurement signal and drawn through the first and second bar electrodes whenever a stylus contacts the conductive layer, whereby the stylus contacting the conducting layer divides the total resistance into first and second resistances that cause currents to be drawn through the first and second bar electrodes in proportion to the separation between the bar electrodes and the location; and noise compensating means to compensate for the component of the image signal received by the conductive surface as electrical noise.

13. A touch panel system having an optically transparent, electrically conductive surface positioned adjacent a display screen upon which an image is rendered in response to an image signal that includes a periodic timing pulse, the conductive surface including first and second side margins of preselected lengths and receiving as electrical noise the periodic timing pulse, comprising:

signal generating means for generating a time-varying position measurement signal of a substantially constant frequency and a preselected magnitude;

first and second electrodes positioned along the lengths of the respective first and second side margins and receiving the position measurement signal generated by the signal generating means, the resistivity of the conductive layer establishing an effective total resistance between the first and second electrodes;

current measuring means for measuring currents corresponding to the position measurement signal and drawn through the first and second electrodes whenever a stylus contacts the conductive layer, whereby the stylus contacting the conductive layer divides the total resistance into first and second resistances that cause currents to be drawn through the first and second electrodes in proportion to the separation between the electrodes and the location; and noise compensating means for compensating for the periodic timing pulse received by the conductive surface as electrical noise, the noise compensating means including interrupting means to interrupt the address signal in response to such a timing pulse.

14. The system of claim 13 in which the noise compensating means further includes a pulse detecting means for detecting the periodic timing pulse and for generating a control signal in response to which the interrupting means interrupts the address signal.

15. The system of claim 13 in which a display device renders the image on the display screen in accordance with the image signal, which includes a horizontal flyback pulse that is the periodic timing pulse in response to which the interrupting means interrupts the address signal.

16. The system of claim 13 in which the measurement signal is of a first frequency and the timing signal is of a second frequency that is lower than the first frequency.

17. The system of claim 12 further comprising a source output filter having a high output impedance and being electrically connected between the signal generating means and the electrodes.

18. The system of claim 17 in which the source output filter includes a low-pass filter.

19. The system of claim 12 in which the position measurement signal generated by the signal generating means is a continuous square-wave signal.

20. The system of claim 12 in which the current measuring means measures in parallel the currents drawn through the first and second bar electrodes.

21. The system of claim 12 in which the current measuring means includes means for generating a first potential difference proportional to a current drawn through the first electrode, and a first differential amplifier having first and second inputs across which the first potential difference is applied, the first differential amplifier forming on a first output a signal representing the current drawn through the first electrode.

22. The system of claim 21 in which the current measuring means further includes means for generating a second potential difference proportional to a current drawn through the second electrode, and a second differential amplifier having third and fourth inputs across which the second potential difference is applied, the second differential amplifier forming on a second output a signal representing the current drawn through the second electrode.

23. The system of claim 12 in which the conductive layer is disposed on an optically transparent faceplate that is positioned adjacent the display surface.

24. The system of claim 12 in which the conductive layer further comprises third and fourth opposed side margins of preselected lengths positioned transverse to the first and second side margins and in which the system further comprises:

third and fourth electrodes positioned along the lengths of the respective third and fourth bar opposed side margins and receiving the position measurement signal generated by the signal generating means; and current measuring means for measuring currents corresponding to the position measurement and drawn through the third and fourth bar electrodes whenever the stylus contacts the conductive layer.

25. The system of claim 24 in which the location at which the stylus contacts the conductive layer is defined in connection with first and second orthogonal axes and in which the currents drawn through the first and second bar electrodes define the location along the first axis and the currents drawn through the third and fourth bar electrodes define the location along the second axis.

* * * * *

UNITED STATES PATENT AND TRADEMARK OFFICE
CERTIFICATE OF CORRECTION

PATENT NO. : 4,853,498

DATED : August 1, 1989

INVENTOR(S) : Robert D. Meadows and Roger J. McCoy

It is certified that error appears in the above-identified patent and that said Letters Patent is hereby corrected as shown below:

In the claims:

Claim 1, at line 9 of the claim (column 10, line 4), insert the missing line --signal generating means for generating a-- preceding "time-varying".

Claim 17, in line 4 of the claim (column 13, line 7), after "the" insert --bar--.

Claim 24, in line 6 of the claim (column 14, line 12), after "fourth" insert --bar--; in line 7 (column 14, line 13) delete "bar".

Signed and Sealed this

Twenty-ninth Day of May, 1990

*Attest:*

HARRY F. MANBECK, JR.

*Attesting Officer*   *Commissioner of Patents and Trademarks*